US011516266B1

(12) United States Patent
Ramachandran et al.

(10) Patent No.: US 11,516,266 B1
(45) Date of Patent: Nov. 29, 2022

(54) TRANSFERRING VIDEO ENCODING OR DECODING DEVICES ACROSS REGIONS OF A CLOUD PROVIDER NETWORK

(71) Applicant: Amazon Technologies, Inc., Seattle, WA (US)

(72) Inventors: Akhil Ramachandran, Hillsboro, OR (US); Sai Rahul Kasula, Portland, OR (US); Matthew Rives Vegas, Portland, OR (US); Darin J. Klaas, Beaverton, OR (US); Brian J. Rundle, Portland, OR (US); Gregory Truax, Portland, OR (US); Kevin Moore, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/360,930

(22) Filed: Jun. 28, 2021

(51) Int. Cl.
G06F 7/04 (2006.01)
H04L 65/60 (2022.01)
H04L 67/10 (2022.01)
H04L 9/40 (2022.01)
H04L 67/02 (2022.01)

(52) U.S. Cl.
CPC .......... *H04L 65/60* (2013.01); *H04L 63/0442* (2013.01); *H04L 63/0823* (2013.01); *H04L 67/02* (2013.01); *H04L 67/10* (2013.01)

(58) Field of Classification Search
CPC . H04L 65/60; H04L 63/0442; H04L 63/0823; H04L 67/02; H04L 67/10
See application file for complete search history.

(56) References Cited

U.S. PATENT DOCUMENTS

2012/0154526 A1\* 6/2012 Ji .......................... H04N 13/106
348/43
2022/0006970 A1\* 1/2022 Bian .................... H04N 7/0127

\* cited by examiner

Primary Examiner — Cheikh T Ndiaye
(74) Attorney, Agent, or Firm — Nicholson De Vos Webster & Elliott LLP

(57) ABSTRACT

Techniques are described enabling users to transfer the association of a cloud-managed video encoding or decoding device from one region of a cloud provider network to another. A video processing service of a cloud provider network enables users to purchase video encoding or decoding devices that can be used to encode and reliably transfer video content to the video processing service from locations of the users' choice. The video processing service receives a request to transfer the association of a video encoding or decoding device from one region of the cloud provider to another and the video processing service executes workflows that enable the association of a video encoding or decoding device to be transferred to one region from another.

20 Claims, 8 Drawing Sheets

TRANSFERRING VIDEO ENCODING OR DECODING DEVICES ACROSS REGIONS OF A CLOUD PROVIDER NETWORK

BACKGROUND

In video processing workflows, an encoder compresses a video stream by taking high-quality video as input and producing compressed renditions as output. The task of encoding pre-recorded video files can be compute-intensive, and even more so for live video. The encoding of live video, for example, is typically performed in real time and an encoder thus needs to be powerful and flexible enough to produce encoded video such that viewers see an uninterrupted video stream and in various sizes and formats needed to serve a range of viewing devices.

BRIEF DESCRIPTION OF DRAWINGS

Various embodiments in accordance with the present disclosure will be described with reference to the drawings, in which.

DETAILED DESCRIPTION

Figure 1:
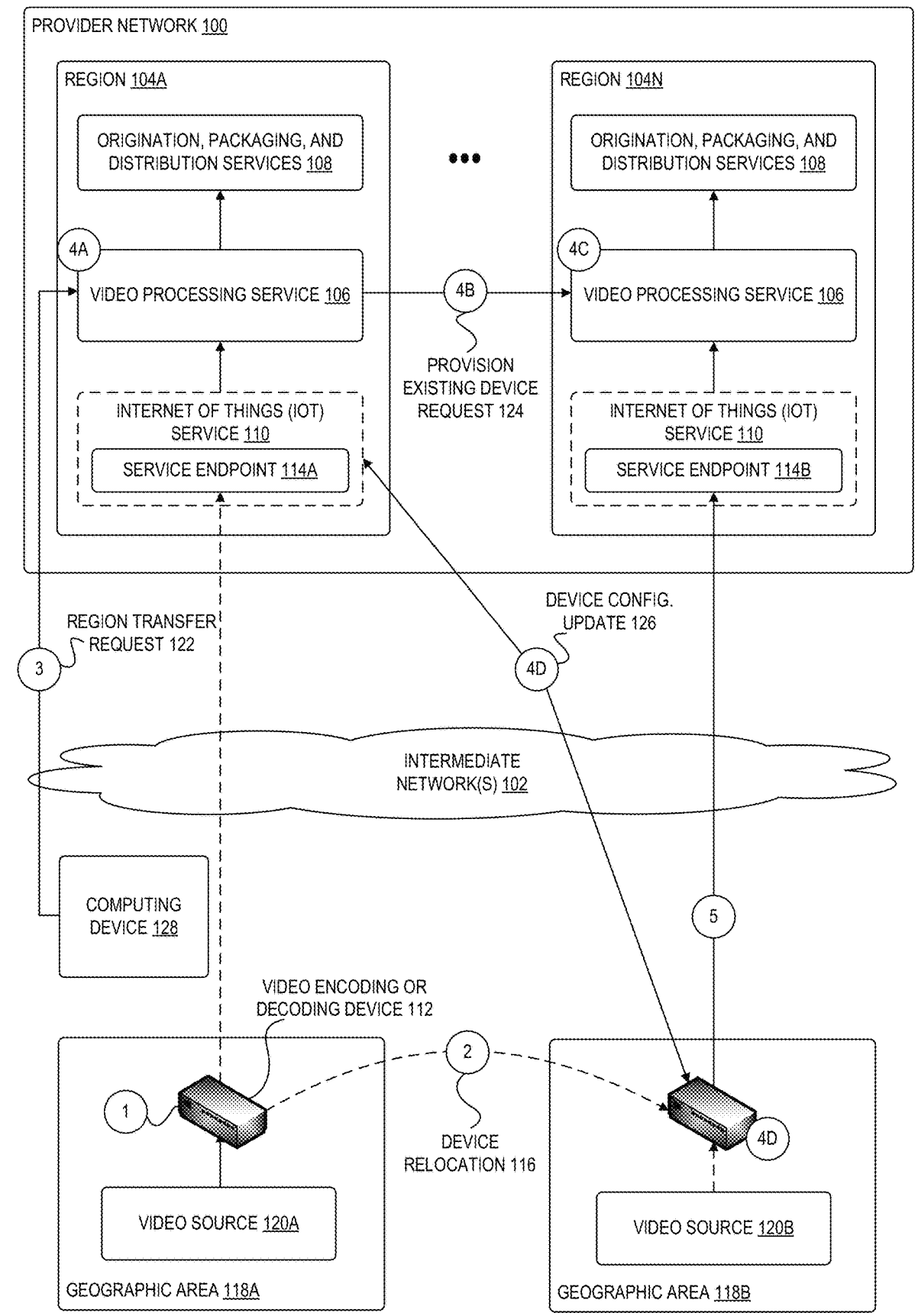
FIG. 1 is a diagram illustrating an environment for enabling users of a video processing service to transfer an association of a cloud-managed video encoding or decoding device from one region of a cloud provider network to another according to some embodiments.

The present disclosure relates to methods, apparatus, systems, and non-transitory computer-readable storage media for enabling users to transfer the association of a cloud-managed video encoding or decoding device (or contribution encoder) from one region of a cloud provider network to another. According to some embodiments, a video processing service of a cloud provider network enables users to purchase video encoding or decoding devices that can be used to encode and reliably transfer video content to the video processing service from locations of the users' choice. The video encoding or decoding devices provided to users are preconfigured to deliver video content to a video processing pipeline implemented by resources provisioned in a specified region of the cloud provider network.

In some embodiments, the video processing service receives a request to transfer the association of a video encoding or decoding device from one region of the cloud provider to another. For example, a user might move a video encoding or decoding device from one geographic area to another to connect the device to a video source in a different geographic area or to move the video encoding or decoding device closer to a relevant audience. In these examples and others, the user might desire to improve the latency with which the video encoding or decoding device delivers video content to the video processing service by associating the device with a cloud provider network region that is more proximate to the current geographic area in which the video encoding or decoding device is located, or with a region that is proximate to a significant portion of the video content's audience. Responsive to such requests, the video processing service executes workflows that enable the association of a video encoding or decoding device to be transferred to one region from another, thereby enabling a video encoding or decoding device to connect to a more proximate endpoint of the cloud provider network and to improve an end-to-end latency of associated video processing workflows.

Some cloud provider networks today provide video processing services that enable users to create high-quality video streams for delivery to broadcast televisions and internet-connected multiscreen devices such as connected TVs, tablets, smart phones, and set-top boxes. These services, for example, can encode users' live video streams in real-time, taking a live video source and compressing it into smaller versions for distribution to viewers. To enable these features and others, the video processing services automate the provisioning and management of the infrastructure used for video encoding, allowing users to readily deploy live video channels. These services, for example, can transparently provision video processing resources for users and further manage scaling, failover, monitoring, and reporting needed to power users' live video streams.

Some cloud provider networks further provide users with the option of obtaining video encoding or decoding devices that can be used by users at on-premises locations to connect live video sources (e.g., a camera or video production equipment) to a video processing service provided by the cloud provider network, as described above. These video encoding or decoding devices (sometimes also referred to as contribution encoders) offer an efficient way for users to transfer video securely and reliably to the cloud-based video processing service for delivery to viewers. In many cases, to use a video encoding or decoding device provided by a cloud provider network, a user need only to connect the device to power, Ethernet, and a video source. A user can then control and monitor the video encoding or decoding device by accessing a web-based console provided by the cloud provider network. In some cases, a video encoding or decoding device provided to a user is preconfigured for the user's account with the cloud provider network and, once connected to power and the internet, is available as a source for the video processing service for live streaming based on the user's configurations.

The pre-configuration of such video encoding or decoding devices provided by a cloud provider network can include the selection of a region of the cloud provider network with which the device is to be associated. A cloud provider network, for example, can be formed as any number of separate regions, where a region is a geographical area in which the cloud provider clusters data centers. A user purchasing a video encoding or decoding device thus might specify that the device is to be associated with a region proximate to where the user intends to use the device (e.g., a region associated with the western United States for a user located in California). Based on this user request, the video processing service provisions and manages resources in the selected region used to implement a video processing workflow for the user. These resources can include, for example, a service endpoint to which the video encoding or decoding device is configured to send video content from a source location and security credentials to be used by the video encoding or decoding device to authenticate with the cloud provider network via the service endpoint.

The portability of the video encoding or decoding devices as described above can be used to improve the reliability and latency of content contribution to a cloud-based video encoding service by enabling customers to build channels in a region closest to the content origination. As an example, a video production team may be covering live events in different geographic regions of the world and may thus desire video processing workloads in a nearest supported region for each event. A user may thus further desire the ability to transfer the association of an existing video encoding or decoding device from one region of the cloud provider network to another, for example, to associate a video encoding or decoding device with a region most proximate to a current location of the user's video encoding or decoding device.

According to embodiments described herein, a video processing service provides interfaces and automated workflows that enable users to readily transfer the association of an on-premises encoding device with one region of a cloud provider network to another. In some embodiments, the process of migrating the association of an on-premises encoding device with one region to another region involves the orchestration of workflows executed by both the video processing service and by the associated on-premises encoding device. In the source region, for example, workflows are executed to create resources for the device in the target region (e.g., service endpoints, database table records, security credentials and certificates, etc.). Workflows at the video encoding or decoding device can be further executed, e.g., to update a service endpoint with which the device is to communicate. Additional details related to these processes and others are described herein.

FIG. 1 is a diagram illustrating an environment for enabling users of a video processing service to transfer an association of a cloud-managed video encoding or decoding device from one region of a cloud provider network to another according to some embodiments. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these can be used somewhat interchangeably depending upon the context of use. Users can interact with a provider network 100 across one or more intermediate networks 102 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions (including, e.g., regions 104A, . . . , 104N), where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations, such as transferring customer data to and from the customer resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

An on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer can use the on-demand code execution service by uploading their code and use one or more APIs to request that the service identify, provision, and manage any resources required to run the code.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some embodiments the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

The video processing service 106 is a broadcast-grade live video processing service. In some embodiments, a live streaming workflow managed by the video processing service includes at least three systems: a channel, which ingests and transcodes users' source content; one or more upstream systems that provide the source content (e.g., the video) to the video processing service; and one or more downstream systems that are the destinations for the output of the video processing service (e.g., one or more origination, packaging, and distribution services 108). A typical downstream system, for example, consists of an origin service or a packager that is connected to the video processing service, a content distribution network (CDN) that is downstream of the origin service or the packager, and a playback device or website where users view the content.

In some embodiments, to create a live streaming workflow using the video processing service 106, a user first creates one or more inputs. These inputs contain information, for example, about how the video processing service 106 and the upstream system(s) are connected. A user also creates a channel and attaches the inputs to the channel. The channel configuration data in turn includes information about how the video processing service connects to the downstream systems. To start processing content received from an input, a user starts the channel. When a channel is running, it ingests source content from the upstream system that is identified by the input and transcodes that video (and any related audio, captions, and metadata) into outputs. The video processing service then sends the outputs to the specified downstream systems.

In some embodiments, the processing within the video processing service 106 occurs within one or more pipelines. If a user configures a workflow so that a channel and inputs have two pipelines, both pipelines work independently of each other but perform identical processing. The use of two or more pipelines thus provides resiliency within the video processing service. With two pipelines, the upstream system is setup to provide two sources, and the downstream system is set up to receive two outputs. In some embodiments, an input contains information about how an upstream system and a channel connect to each other. The connection between the input and the upstream system might be a push (e.g., the upstream system pushes the content) or a pull (e.g., the video processing service pulls the content from the upstream system). In some embodiments, a push input has an input security group associated with, which identifies a range of IP addresses that includes the source addresses of the upstream system. IP addresses within the specified range are allowed to push content to the input.

In some embodiments, a channel managed by the video processing service 106 ingests source content, transcodes it (decodes and encodes it), and packages it into output groups. There are different types of output groups to handle the requirements of different downstream systems. An output group consists of one or more outputs, where each output contains a specific combination of encodes. In some embodiments, an encode is one video stream, one audio stream, and one captions track. Difference encodes have different characteristics. The rules for combining encodes into outputs and for combining outputs into output groups depends on the type of the output group. For example, a channel might contain one HLS output group and one RTMP output group. The HLS output group might contain two outputs: one HLS output contains one high-resolution video, one audio, and one captions encode; the other HLS output contains one low-resolution video, one audio, and no captions. The RTMP output group contains one output that contains one video and one audio.

In some embodiments, the provider network 100 includes an IoT service 110 providing cloud-based services that connect users' devices (e.g., IoT devices) to other devices and to other services provided by the provider network 100.

In the example of FIG. 1, the IoT service 110 is used to connect a user's video encoding or decoding device 112 to the video processing service 106, e.g., via a service endpoint 114A with which the video encoding or decoding device 112 can communicate and send source video content. In some embodiments, the IoT service supports different protocols including, for example, Message Queuing and Telemetry Transport (MQTT), MQTT over Websockets Secure (WSS), Hypertext Transfer Protocol Secure (HTTPS), and Long Range Wide Area Network (LoRaWAN).

In some embodiments, users can obtain video encoding or decoding devices (e.g., a video encoding or decoding device 112) that can be used by users at on-premises locations to connect live video sources (e.g., a camera or video production equipment) to a video processing service 106 provided by the cloud provider network 100. As indicated above, these video encoding or decoding devices 112 (sometimes also referred to as contribution encoders) offer an efficient way for users to transfer video securely and reliably to the cloud-based video processing service for delivery to viewers. In many cases, to use a video encoding or decoding device provided by a cloud provider network, a user need only to connect the device to power, Ethernet, and a video source. A user can then control and monitor the video encoding or decoding device 112 by accessing a web-based console or other interface provided by the cloud provider network 100.

In some embodiments, a video encoding or decoding device 112 provided to a user is preconfigured for the user's account with the cloud provider network 100 (e.g., a user account associated with a person obtaining the video encoding or decoding device 112 for personal use) and, once connected to power and the internet, is available as a source for the video processing service for live streaming based on the user's configurations. For example, as part of the process for obtaining the video encoding or decoding device 112, a user obtaining the device uses a web console or other interface to generate a request to create an association between the video encoding or decoding device and a region of the cloud provider network 100 with which the user intends the device to be associated (e.g., region 104A in the example of FIG. 1). Based on such a request, resources are created for the device including a device certificate (e.g., an X.509 certificate) to be used to perform mutual authentication with the provider network 100, a public/private keypair, and a device identifier, and these resources are installed on the video encoding or decoding device 112. In some embodiments, when the device 112 starts up, it copies the credentials from its local filesystem and obtains device configuration used by the device 112 to communicate with the provider network 100. The device configuration, for example, includes a device identifier (e.g., "hd-30323948s9dc08d0") stored in a device registry, and a service endpoint to which the device is communicate with (e.g., "service_endpoint114a.iot.region-1.example.com"). At circle "1" in FIG. 1, a user obtains such a video encoding or decoding device from the cloud provider network 100, where the device is preconfigured to communicate with a service endpoint 114A associated with the region 104A, as described above.

In some embodiments, at circle "2," the video encoding or decoding device is physically relocated 116 from one geographic area to another (e.g., from a geographic area 118A to a geographic area 118B). As indicated above, the video encoding or decoding device 112 is intended to be portable and a user might move a device from one location to another to use the device in a different location, e.g., to connect the device to a different input video source (e.g., video source 120B in geographic area 118B instead of the video source 120A in geographic areal 18A), to locate the device closer to an expected audience of the video content, or for other reasons or combinations thereof.

Figure 2:
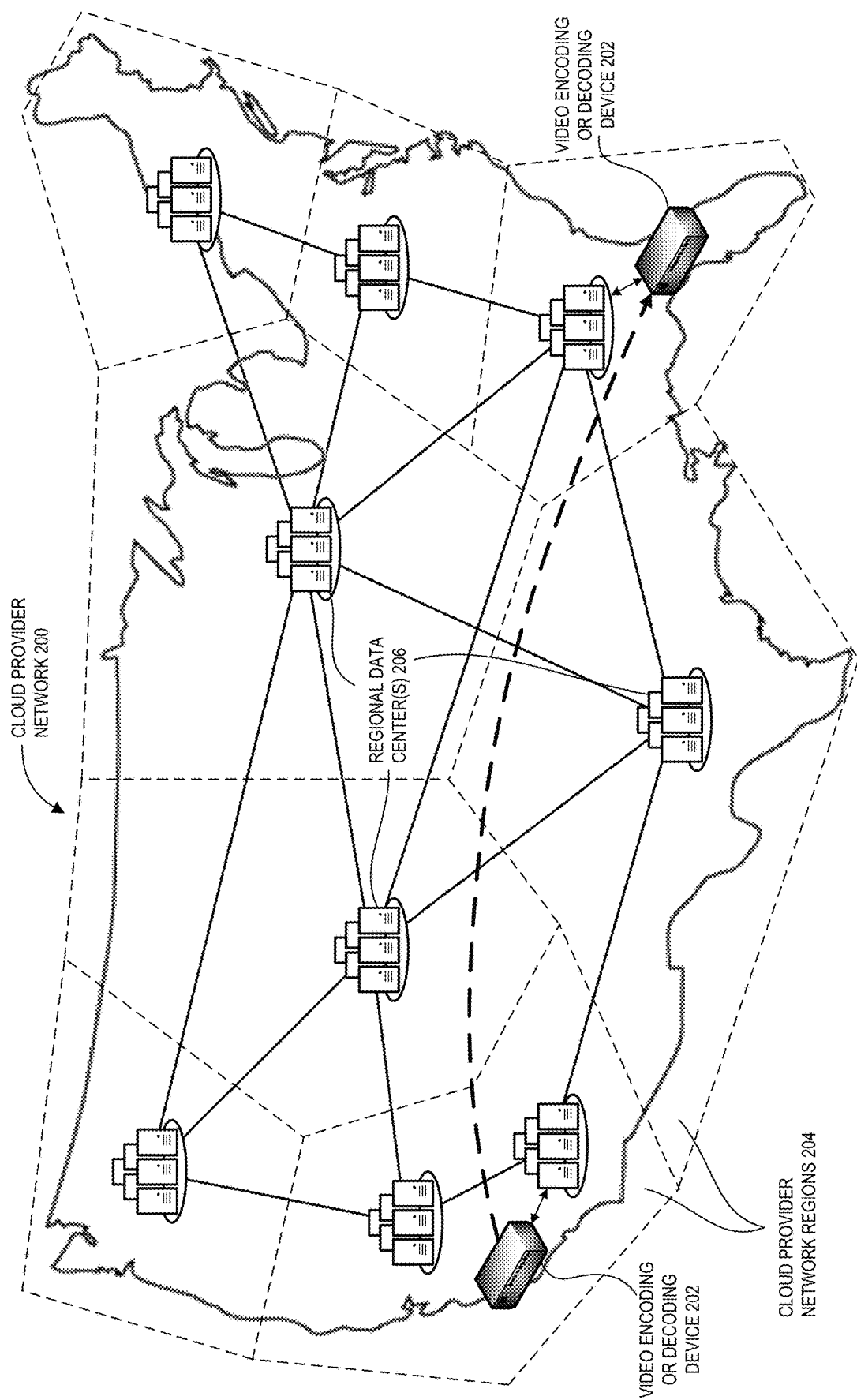
FIG. 2 is a diagram illustrating the physical movement of a video encoding or decoding device from one geographic area to another in relation to the regions of a cloud provider network according to some embodiments.

FIG. 2 illustrates the geographic movement of a video encoding or decoding device from one geographic area to another in relation to the regions of a cloud provider network according to some embodiments. As shown in FIG. 2, a cloud provider network 200 can include any number of cloud provider network regions 204 located across the world. Each region includes one or more regional data centers 206 forming the infrastructure of the provider network 100 and supporting execution of the services provided by the cloud provider network 200. As shown, the video encoding or decoding device 202 might initially be located within a region to which the device has a proximate network connection to the infrastructure in the region but at some point in time be relocated to a different region with more proximate access to other infrastructure of the provider network 200. In these cases and others, a user might desire to transfer the association of a video encoding or decoding device from one region to another.

Returning to FIG. 1, in some embodiments, at circle "3," the video processing service 106 receives a request 122 to transfer the association of an encoding device 112 to another region of the cloud provider network 100. In some embodiments, the request includes parameters identifying the video encoding or decoding device 112 (e.g., a unique identifier of the device generated by the video processing service 106) and an identifier of the target region to which the device association is to be transferred. The request 122 can be generated, for example, using a web-based console, CLI, or any other interface provided by the provider network 100.

Figure 3:
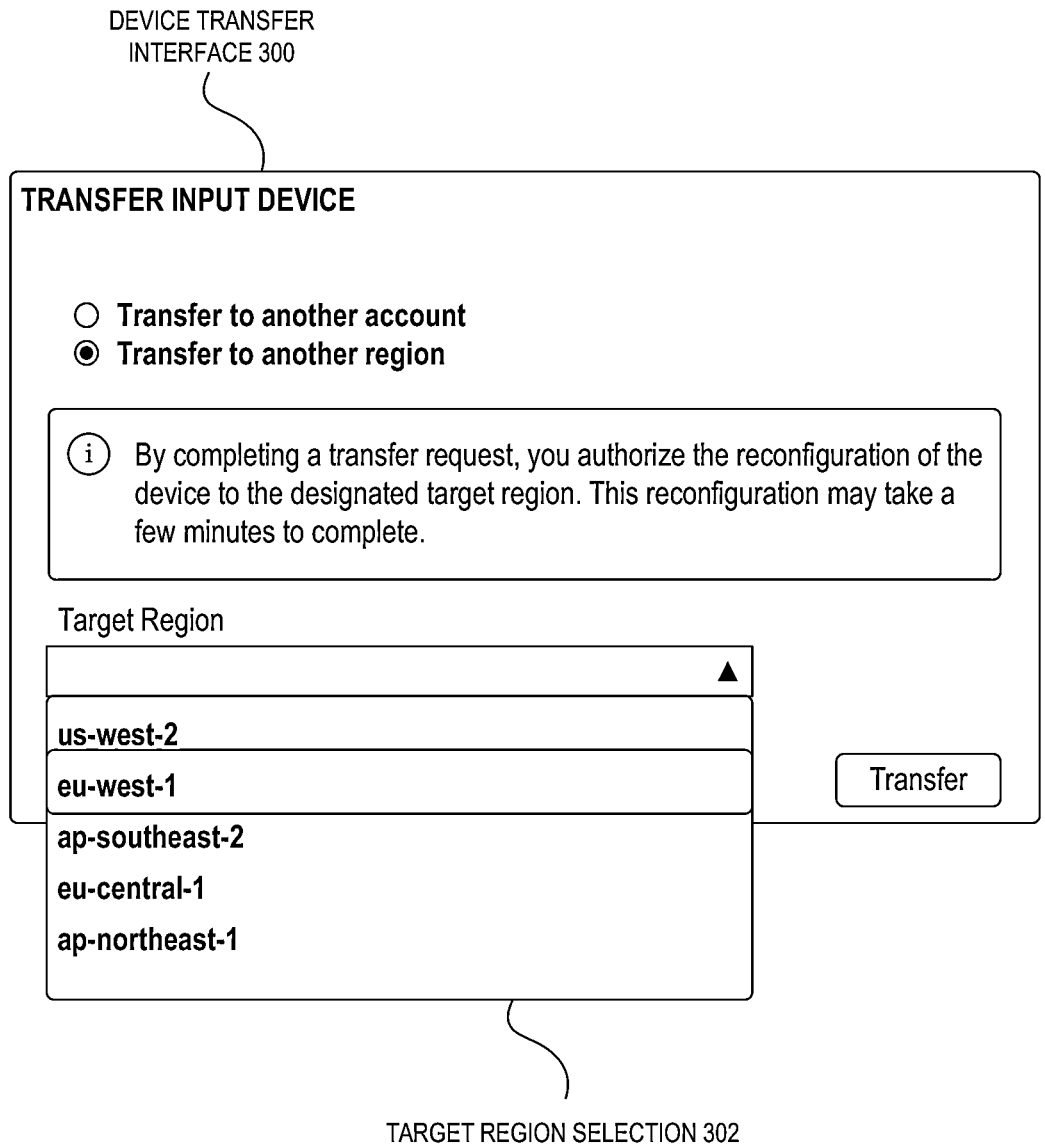
FIG. 3 illustrates an example interface that can be used to request the association of a video encoding or decoding device with one region of a cloud provider network to be transferred to another region according to some embodiments.

FIG. 3 illustrates an example interface that a user can use to request to transfer the association of an encoding device with one region to another region according to some embodiments. The example device transfer interface 300 includes, for example, options that enable a user to either transfer the association of an encoding device to another user account of the provider network 100 or to another region of the provider network. The interface 300 further includes a target region selection 302 interface element that enables a user to select a region to which the user desires to transfer the device's association. Once selected, the user can provide input to the "Transfer" interface button to cause a request to be sent to the video processing service to carry out the region transfer.

In some embodiments, the workflow(s) further include, at circle "4A," the video processing service 106 initially validating the request 122 to ensure that the region transfer can be performed successfully, and obtaining secrets associated with the video encoding or decoding device 112 (e.g., a certificate, a public/private keypair, etc.). At circle "4B," the video processing service 106 generates a request 124 sent to the video processing service 106 in the region 104N to provision resources for the existing video encoding or decoding device 112 in the region 104N. At circle "4C," the video processing service 106 provisions the resources for the video encoding or decoding device 112 in the region 104N, including provisioning a new service endpoint 114B. At circle "4D, the video encoding or decoding device 112 obtains an update 126 to device configuration data used to configure a service endpoint to which the device communicates, etc. At circle "5," the video encoding or decoding device 112 begins transferring video content to the region 104N via the service endpoint 114B. Additional details related to these region transfer workflows are illustrated with respect to FIG. 4.

Figure 4:
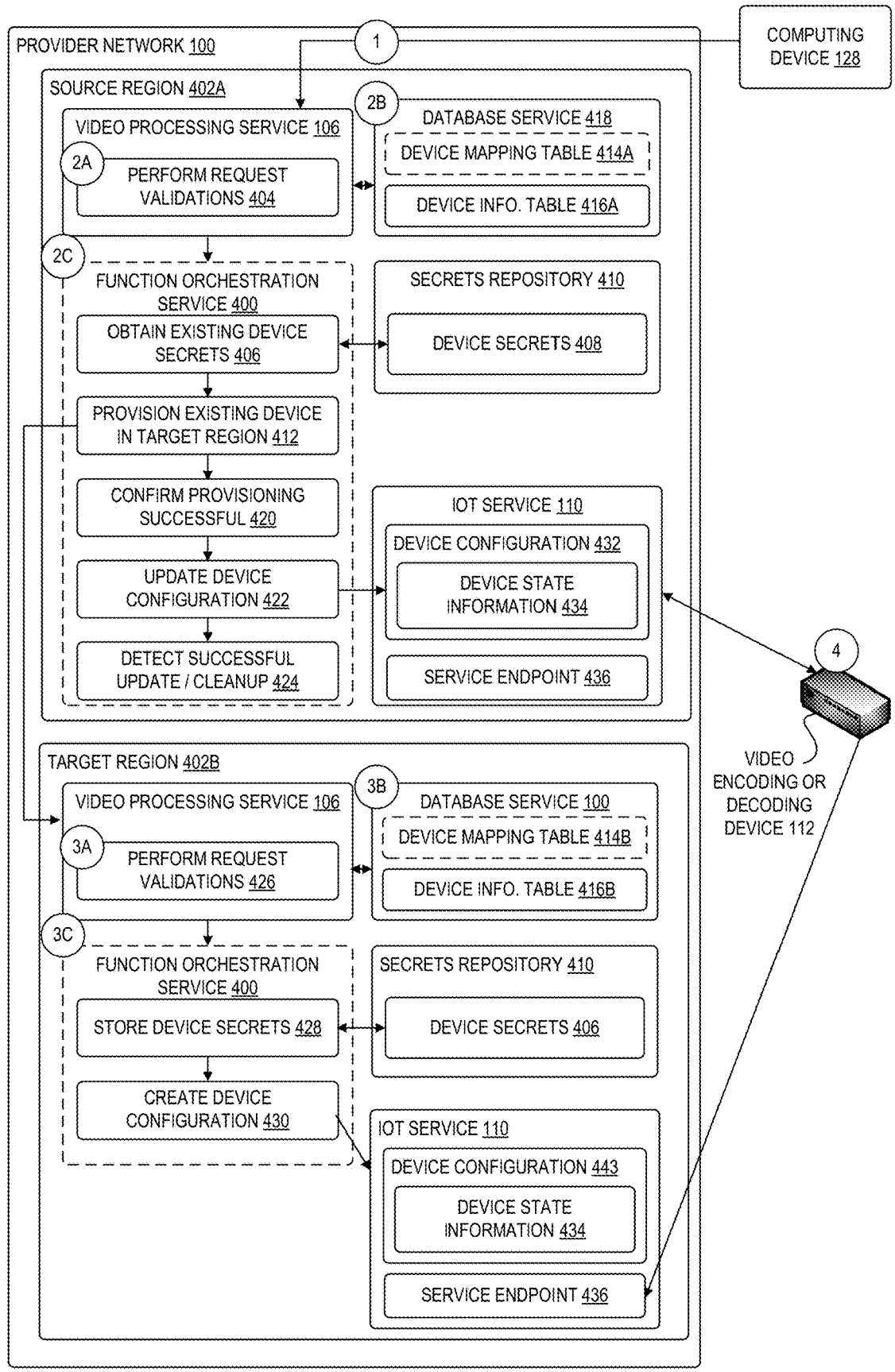
FIG. 4 is a diagram illustrating the use of serverless function orchestrators to implement workflows used to transfer an association of a video encoding or decoding device from one region of a cloud provider network to another according to some embodiments.

Referring to FIG. 4, in some embodiments, the provider network 100 includes a function orchestration service 400 that enables users to create event-driven workflows of sequenced functions (e.g., serverless functions executed by an on-demand code execution service). These event-driven workflows, for example, can include a set of functions where the output of a function acts as input to one or more next functions such that each function executes in an order defined by desired business logic. In some embodiments, a video processing service provides workflows that carry out the region transfer actions in the source region, target region, and on the video encoding or decoding device 112.

In some embodiments, at circle "1" in FIG. 4, the video processing service 106 again receives a request to transfer the association between a video encoding or decoding device 112 and a source region 402A of the provider network 100 to a target region 402B of the provider network 100. As indicated above, the request can be generated by a user using a web-based console, CLI, or any other interface provided by the provider network 100.

In some embodiments, at circle "2A," the video processing service 106 performs request validations 404 on the request received from the computing device 128. These validations can include, for example, determining at least one of: that the video encoding or decoding device is accessible, that the video processing service is supported by the second region of the cloud provider network, that a type of the video encoding or decoding device supports region transfer, or that the device is not currently undergoing an update. In some embodiments, the validations can include determining whether the second region is associated with any applicable data protection or privacy regulations and, if so, cause display of a notification or other alert notifying the user.

In some embodiments, at circle "2B," the video processing service 106 updates data about the video encoding or decoding device 112 stored in a device mapping table 414A, a device information table 416A, or both. In some embodiments, these tables are provisioned using a database service 418 of the provider network 100. The device mapping table 414A, for example, can be optionally used to indicate a "cell" with which the video encoding or decoding device 112 is associated in cases where the video processing service 106 is implemented using a cell-based architecture. The device information table 416A, for example, can store information about a video encoding or decoding device such as the device identifier, a device serial number, a status of the video encoding or decoding device, etc. In some embodiments, the status information is specific to each region, e.g., where the status information may indicate that a video encoding or decoding device is active in one region and inactive in another region (e.g., because the device was previously transferred from one region to another).

In some embodiments, at circle "2C," the video processing service 106 causes execution of workflow in the source region 402A using the function orchestration service 400. In some embodiments, the functions of the workflow include a function used to obtain 406 the existing device secrets 408 for the video encoding or decoding device (e.g., a certificate, public/private key pair, etc.) stored in the source region 402A. In some embodiments, the device secrets are stored in a secrets repository 410 which, for example, may be managed by a secrets manager service of the cloud provider network 100. In other examples, the device secrets are stored by the IoT service 110, video processing service 106, or any other storage location accessible to the video processing service 106.

In some embodiments, the functions of the workflow further include a function to request the provisioning 412 of the existing device in the target region, where the request can be sent using an API provided by the video processing service 106. In some embodiments, the request includes the device identifier and the obtained device secrets 408 (or an identifier of a location at which the device secrets 408 can be obtained). At a high level, the request to provision the existing device causes the video processing service 106 in the target region 402B to create or modify resources used by the video encoding or decoding device to operate a video processing workflow in the target region 402B. These actions are described in more detail hereinafter with respect to circles "3A"-"3C".

In some embodiments, after requesting to provision the existing device in the target region, the workflow confirms 420 the successful provisioning of the video encoding or decoding device 112 resources in the target region 420B (e.g., based on a success message received from the video processing service 106 in the target region or other source). In some embodiments, once confirmed, the workflow updates 422 device state information 434 associated with the video encoding or decoding device 112 to enable the video encoding or decoding device 112 to begin communicating with the service endpoint 436 in the target region 402B. In some embodiments, the device state information 434 is managed by the IoT service 110 as part of device configuration 432 (e.g., a JSON configuration document). Once updated by the video processing service 106, the video encoding or decoding device 112 obtains the updated device configuration 432 including an identifier of the service endpoint 436 and reconfigures itself to communicate with the new endpoint.

In some embodiments, once the video encoding or decoding device 112 is configured to communicate with the new service endpoint 436, the video processing service 106 polls for the connection status in the new and old regions. Once it is detected that the video encoding or decoding device 112 can communicate with the new service endpoint, in some embodiments, the video processing service 106 deletes or archives the device configuration 432 in the source region 402A. In some embodiments, the workflow then detects 424 whether the device update was successful (e.g., based on a status message received from the video encoding or decoding device 112 or IoT service 110) and cleans up any extraneous files.

As indicated above, part of the workflow performed in the source region 402A includes sending a request to the video processing service 106 in the target region 402B to provision the existing video encoding or decoding device. In some embodiments, responsive to this request, at circle "3A," the video processing service 106 performs 426 request validations in the target region 402B. At circle "3B," the video processing service 106 updates data about the video encoding or decoding device 112 stored in a device mapping table 414B and device information table 416B, as described above. For example, the video processing service 106 may determine whether the device already exists in a mapping table 414B (e.g., indicating that the same device was previously associated with the region). If the device is not present in the device mapping table, in some embodiments, a cell with which to associate the video encoding or decoding device 112 is selected and the details are added to the mapping table. If the video encoding or decoding device 112 already exists in the device mapping table, the corresponding cell is used. In some embodiments, information about the video encoding or decoding device 112 is also updated in the device information table 416B in the target region 402B (e.g., to indicate that the device will be active in the target region 402B).

In some embodiments, at circle "3C," the video processing service 106 creates new device configuration 443 for the video encoding or decoding device 112 using the IoT service 110, including registering the obtained secrets for the video encoding or decoding device 112. Although described sequentially, each of the operations 2A-2C and 3A-3C can be performed in any order and some cases concurrently. At circle "4," once video encoding or decoding device 112 updates its internal configuration as described above, e.g., to store a new service endpoint to which the device is to send video content, optionally to update secrets data to be used by the device, etc. The device may reboot and start communicating with the new region.

Figure 5:
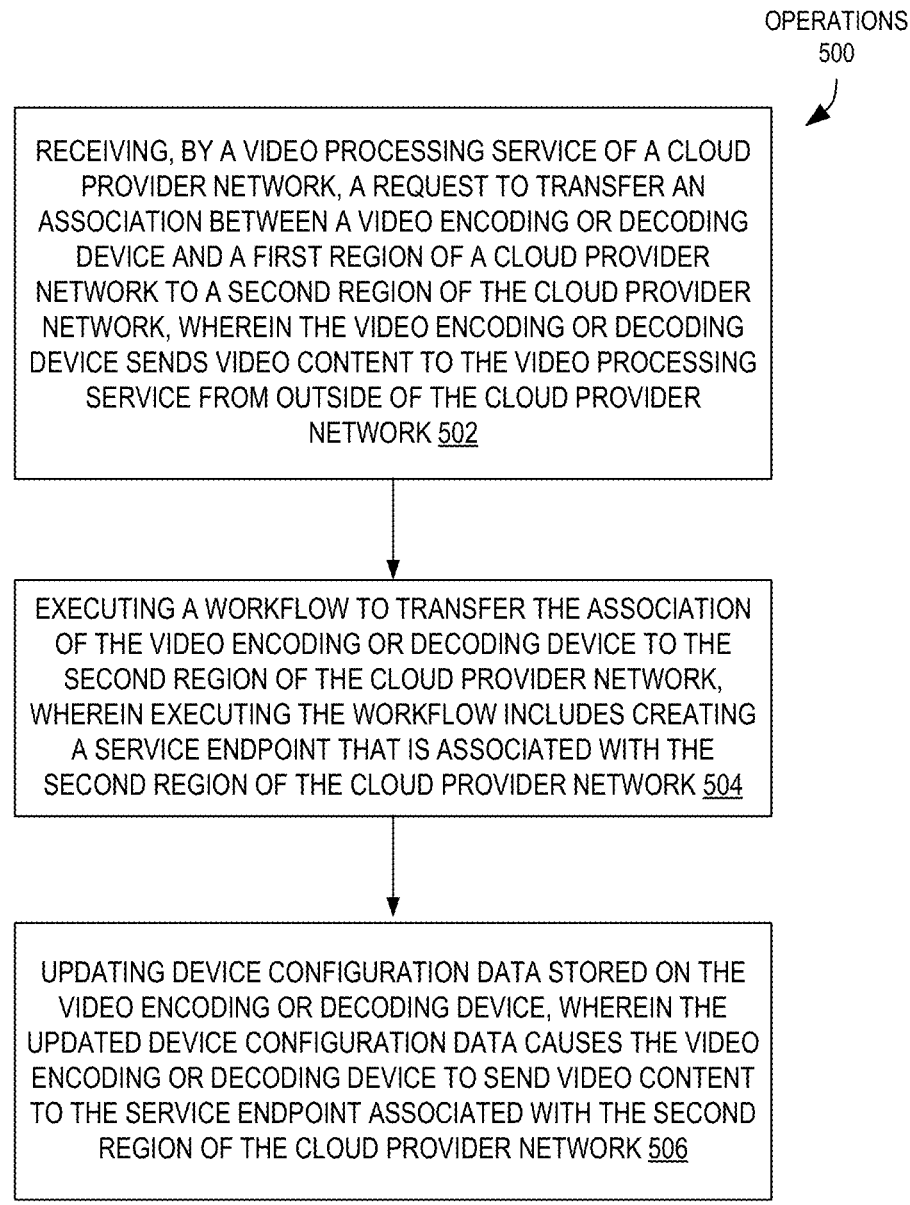
FIG. 5 is a flow diagram illustrating operations of a method for processing a request to transfer an association of video encoding or decoding device from one region of a cloud provider network to another according to some embodiments.

FIG. 5 is a flow diagram illustrating operations 500 of a method for enabling users to transfer the association of a cloud-managed video encoding or decoding device (or contribution encoder) from one region of a cloud provider network to another according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by a video processing service 106 of the other figures.

The operations 500 include, at block 502, receiving, by a video processing service of a cloud provider network, a request to transfer an association between a video encoding or decoding device and a first region of a cloud provider network to a second region of the cloud provider network, wherein the video encoding or decoding device sends video content to the video processing service from outside of the cloud provider network.

The operations 500 further include, at block 504, executing a workflow to transfer the association of the video encoding or decoding device to the second region of the cloud provider network, wherein executing the workflow includes creating a service endpoint that is associated with the second region of the cloud provider network.

The operations 500 further include, at block 506, updating device configuration data stored on the video encoding or decoding device, wherein the updated device configuration data causes the video encoding or decoding device to send video content to the service endpoint associated with the second region of the cloud provider network.

In some embodiments, the operations further include obtaining a device certificate used by the video encoding or decoding device to authenticate with the cloud provider network in the first region, and a key pair used to encrypt data sent by the video encoding or decoding device, and storing the device certificate and the key pair in the second region, wherein the video encoding or decoding device uses the device certificate to authenticate with the cloud provider network in the second region.

In some embodiments, a network latency between the video encoding or decoding device and the second region of the cloud provider network is different than a network latency between the video encoding or decoding device and the first region of the cloud provider network.

In some embodiments, the operations further include receiving, by a video processing service of a cloud provider network, a request to create an association between a video encoding or decoding device and a first region of the cloud provider network comprising a plurality of regions; creating computing resources used to implement a video streaming workflow to be used to process video content received from the video encoding or decoding device, wherein the computing resources include a first service endpoint to which the video encoding or decoding device sends video content from outside of the cloud provider network, and wherein the first service endpoint is associated with the first region of the cloud provider network; and storing device configuration data on the video encoding or decoding device that causes the video encoding or decoding device to send video content to the first service endpoint.

In some embodiments, the request to transfer an association between the video encoding or decoding device and the first region of the cloud provider network to a second region of the cloud provider network is received via a web-based console provided by the video processing service, and wherein the web-based console includes an interface element that enables selection of the second region from a plurality of supported regions of the cloud provider network.

In some embodiments, the operations further include validating the request to transfer an association between the video encoding or decoding device and the first region of the cloud provider network to the second region of the cloud provider network, wherein the validating the request includes determining at least one of: that the video encoding or decoding device is accessible, that the video processing service is supported by the second region of the cloud provider network, that a type of the video encoding or decoding device supports region transfer, or that the device is not currently undergoing an update.

In some embodiments, the operations further include determining that resources for the video encoding or decoding device are successfully provisioned in the second region of the cloud provider network; and updating device configuration data for the video encoding or decoding device managed by an Internet of Things (IoT) service of the cloud provider network, wherein updating the device configuration data for the video encoding or decoding device causes the video encoding or decoding device to update the device configuration data stored on the video encoding or decoding device.

In some embodiments, the request further specifies an availability zone of the second region of the cloud provider network, and wherein the service endpoint is further associated with the availability zone of the second region of the cloud provider network.

In some embodiments, the video processing service further updates first device status data for the video encoding or decoding device stored in a first datastore of the first region of the cloud provider network and updates second device status data for the video encoding or decoding device stored in a second datastore of the second region of the cloud provider network, wherein the first device status data is updated to indicate that the video encoding or decoding device is inactive in the first region and the second device status data is updated to indicate that the video encoding or decoding device is active in the second region.

In some embodiments, the operations further include generating a device certificate to be used by the video encoding or decoding device to authenticate with the cloud provider network in the second region, and a key pair used to encrypt data sent by the video encoding or decoding device, and sending the device certificate and the key pair to the video encoding or decoding device for storage on the video encoding or decoding device.

In some embodiments, the workflow includes a plurality of serverless functions the execution of which is orchestrated by a serverless function orchestrator of the cloud provider network.

Figure 6:
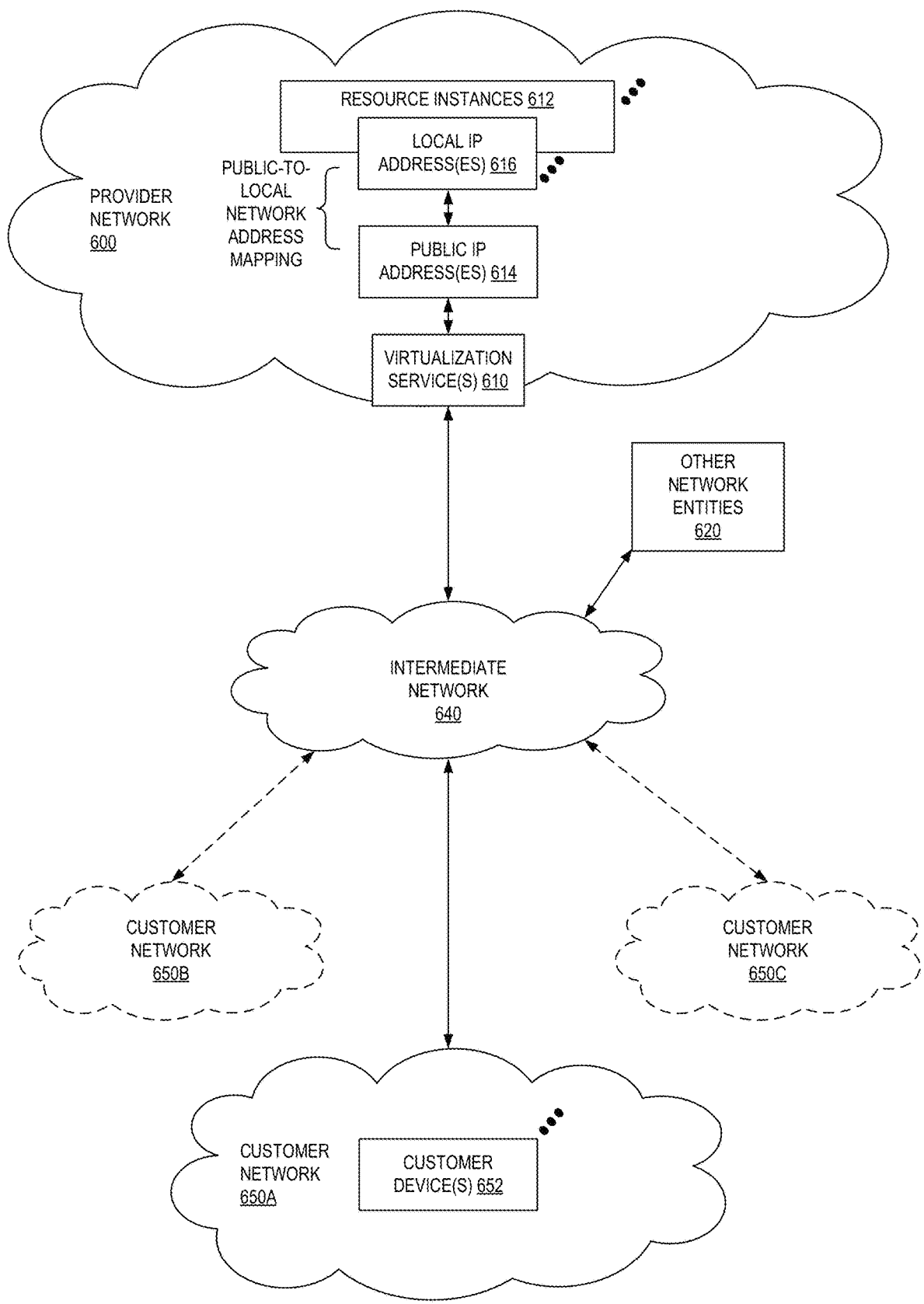
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
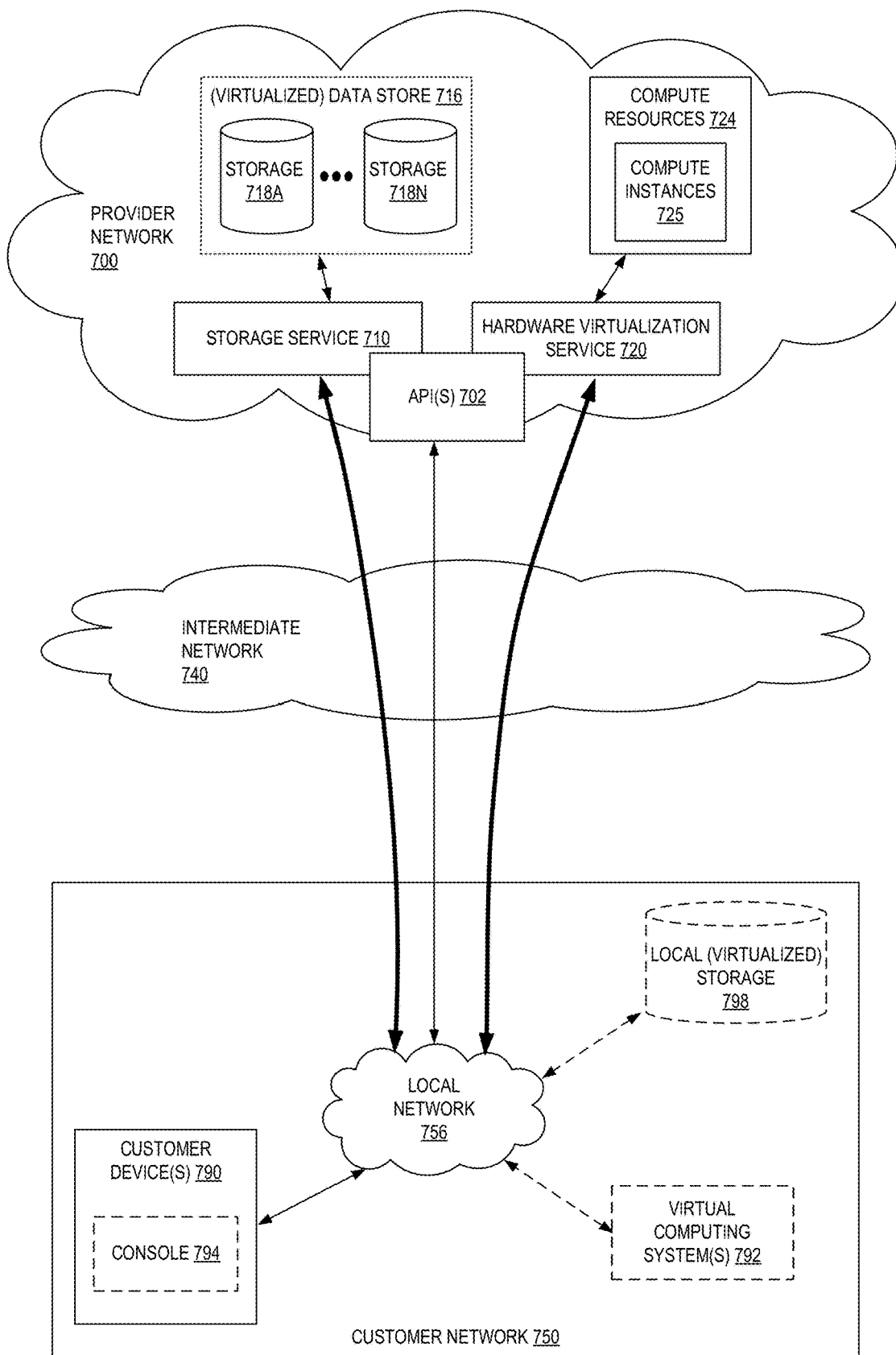
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
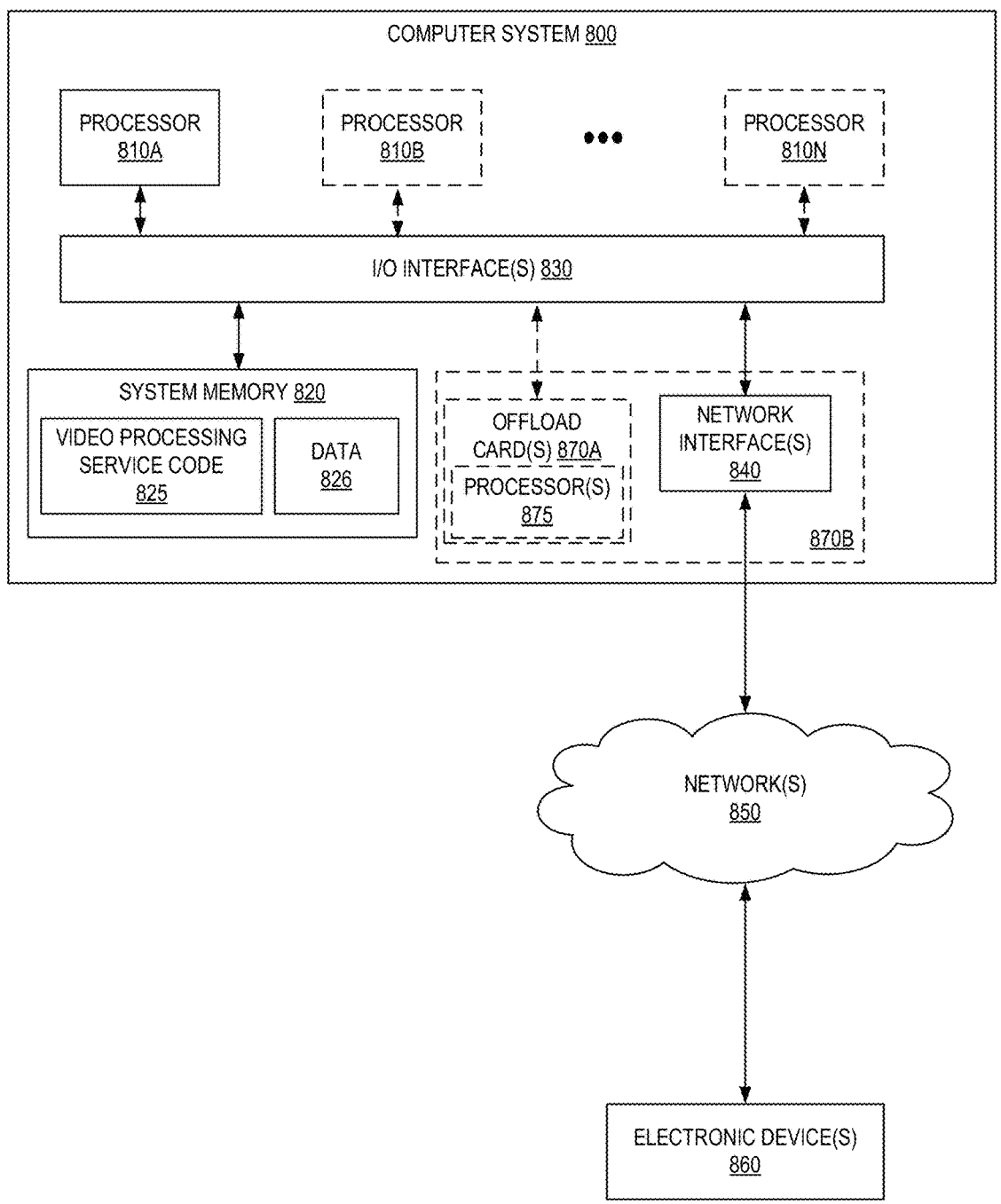
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as video processing service code 825 (e.g., executable to implement, in whole or in part, the video processing service 106) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and can not coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
receiving, by a video processing service of a cloud provider network, a request to create an association between a video encoding or decoding device and a first region of the cloud provider network comprising a plurality of regions;
creating computing resources used to implement a video streaming workflow to be used to process video content received from the video encoding or decoding device, wherein the computing resources include a first service endpoint to which the video encoding or decoding device sends video content from outside of the cloud provider network, and wherein the first service endpoint is associated with the first region of the cloud provider network;
storing device configuration data on the video encoding or decoding device that causes the video encoding or decoding device to send video content to the first service endpoint;
receiving a request to transfer the association between the video encoding or decoding device and the first region of the cloud provider network to a second region of the cloud provider network;
executing a workflow to transfer the association of the video encoding or decoding device to the second region of the cloud provider network, wherein executing the workflow includes creating a second service endpoint that is associated with the second region of the cloud provider network; and
updating the device configuration data on the video encoding or decoding device, wherein the updated device configuration causes the video encoding or decoding device to send video content to the second service endpoint in the second region of the cloud provider network.

2. The computer-implemented method of claim 1, wherein executing the workflow further includes:
obtaining a device certificate used by the video encoding or decoding device to authenticate with the cloud provider network in the first region, and a key pair used to encrypt data sent by the video encoding or decoding device; and
storing the device certificate and the key pair in the second region, wherein the video encoding or decoding device uses the device certificate to authenticate with the cloud provider network in the second region.

3. The computer-implemented method of claim 1, wherein a network latency between the video encoding or decoding device and the second region of the cloud provider network is different than a network latency between the video encoding or decoding device and the first region of the cloud provider network.

4. A computer-implemented method comprising:
receiving, by a video processing service of a cloud provider network, a request to transfer an association between a video encoding or decoding device and a first region of a cloud provider network to a second region of the cloud provider network, wherein the video encoding or decoding device sends video content to the video processing service from outside of the cloud provider network;
executing a workflow to transfer the association of the video encoding or decoding device to the second region of the cloud provider network, wherein executing the workflow includes creating a service endpoint that is associated with the second region of the cloud provider network; and
updating device configuration data stored on the video encoding or decoding device, wherein the updated device configuration data causes the video encoding or decoding device to send video content to the service endpoint associated with the second region of the cloud provider network.

5. The computer-implemented method of claim 4, wherein executing the workflow further includes:
obtaining a device certificate used by the video encoding or decoding device to authenticate with the cloud provider network in the first region, and a key pair used to encrypt data sent by the video encoding or decoding device; and
storing the device certificate and the key pair in the second region, wherein the video encoding or decoding device uses the device certificate to authenticate with the cloud provider network in the second region.

6. The computer-implemented method of claim 4, wherein a network latency between the video encoding or decoding device and the second region of the cloud provider network is different than a network latency between the video encoding or decoding device and the first region of the cloud provider network.

7. The computer-implemented method of claim 4, further comprising:
receiving, by a video processing service of a cloud provider network, a request to create an association between a video encoding or decoding device and a first region of the cloud provider network comprising a plurality of regions;
creating computing resources used to implement a video streaming workflow to be used to process video content received from the video encoding or decoding device, wherein the computing resources include a first service endpoint to which the video encoding or decoding device sends video content from outside of the cloud provider network, and wherein the first service endpoint is associated with the first region of the cloud provider network; and
storing device configuration data on the video encoding or decoding device that causes the video encoding or decoding device to send video content to the first service endpoint.

8. The computer-implemented method of claim 4, wherein the request to transfer an association between the video encoding or decoding device and the first region of the cloud provider network to a second region of the cloud provider network is received via a web-based console provided by the video processing service, and wherein the web-based console includes an interface element that enables selection of the second region from a plurality of supported regions of the cloud provider network.

9. The computer-implemented method of claim 4, further comprising validating the request to transfer an association between the video encoding or decoding device and the first region of the cloud provider network to the second region of the cloud provider network, wherein the validating the request includes determining at least one of: that the video encoding or decoding device is accessible, that the video processing service is supported by the second region of the cloud provider network, that a type of the video encoding or decoding device supports region transfer, or that the device is not currently undergoing an update.

10. The computer-implemented method of claim 4, further comprising:
  determining that resources for the video encoding or decoding device are successfully provisioned in the second region of the cloud provider network; and
  updating device configuration data for the video encoding or decoding device managed by an Internet of Things (IoT) service of the cloud provider network, wherein updating the device configuration data for the video encoding or decoding device causes the video encoding or decoding device to update the device configuration data stored on the video encoding or decoding device.

11. The computer-implemented method of claim 4, wherein the request further specifies an availability zone of the second region of the cloud provider network, and wherein the service endpoint is further associated with the availability zone of the second region of the cloud provider network.

12. The computer-implemented method of claim 4, wherein the video processing service further updates first device status data for the video encoding or decoding device stored in a first datastore of the first region of the cloud provider network and updates second device status data for the video encoding or decoding device stored in a second datastore of the second region of the cloud provider network, wherein the first device status data is updated to indicate that the video encoding or decoding device is inactive in the first region and the second device status data is updated to indicate that the video encoding or decoding device is active in the second region.

13. The computer-implemented method of claim 4, wherein executing the workflow further includes:
  generating a device certificate to be used by the video encoding or decoding device to authenticate with the cloud provider network in the second region, and a key pair used to encrypt data sent by the video encoding or decoding device; and
  sending the device certificate and the key pair to the video encoding or decoding device for storage on the video encoding or decoding device.

14. The computer-implemented method of claim 4, wherein the workflow includes a plurality of serverless functions the execution of which is orchestrated by a serverless function orchestrator of the cloud provider network.

15. A system comprising:
  a first one or more electronic devices to implement a video encoding or decoding device; and
  a second one or more electronic devices to implement a video processing service, the video processing service including instructions that upon execution cause the video processing service to:
    receive a request to transfer an association between a video encoding or decoding device and a first region of a cloud provider network to a second region of the cloud provider network, wherein the video encoding or decoding device sends video content to the video processing service from outside of the cloud provider network;
    execute a workflow to transfer the association of the video encoding or decoding device to the second region of the cloud provider network, wherein executing the workflow includes creating a service endpoint that is associated with the second region of the cloud provider network; and
    update device configuration data stored on the video encoding or decoding device, wherein the updated device configuration data causes the video encoding or decoding device to send video content to the service endpoint associated with the second region of the cloud provider network.

16. The system of claim 15, wherein executing the workflow further includes:
  obtaining a device certificate used by the video encoding or decoding device to authenticate with the cloud provider network in the first region, and a key pair used to encrypt data sent by the video encoding or decoding device; and
  storing the device certificate and the key pair in the second region, wherein the video encoding or decoding device uses the device certificate to authenticate with the cloud provider network in the second region.

17. The system of claim 15, wherein a network latency between the video encoding or decoding device and the second region of the cloud provider network is less than a network latency between the video encoding or decoding device and the first region of the cloud provider network.

18. The system of claim 15, further comprising:
  receiving, by a video processing service of a cloud provider network, a request to create an association between a video encoding or decoding device and a first region of the cloud provider network comprising a plurality of regions;
  creating computing resources used to implement a video streaming workflow to be used to process video content received from the video encoding or decoding device, wherein the computing resources include a first service endpoint to which the video encoding or decoding device sends video content from outside of the cloud provider network, and wherein the first service endpoint is associated with the first region of the cloud provider network; and
  storing device configuration data on the video encoding or decoding device that causes the video encoding or decoding device to send video content to the first service endpoint.

19. The system of claim 15, wherein the request to transfer an association between the video encoding or decoding device and the first region of the cloud provider network to a second region of the cloud provider network is received via a web-based console provided by the video processing service, and wherein the web-based console includes an interface element that enables selection of the second region from a plurality of supported regions of the cloud provider network.

20. The system of claim 15, further comprising validating the request to transfer an association between the video encoding or decoding device and the first region of the cloud provider network to the second region of the cloud provider network, wherein the validating the request includes determining at least one of: that the video encoding or decoding device is accessible, that the video processing service is supported by the second region of the cloud provider network, that a type of the video encoding or decoding device supports region transfer, or that the device is not currently undergoing an update.

* * * * *